(12) United States Patent
Wilczynski et al.

(10) Patent No.: US 11,388,487 B2
(45) Date of Patent: Jul. 12, 2022

(54) SYSTEMS AND METHODS FOR GENERATING, ANALYZING, AND STORING DATA SNIPPETS

(71) Applicant: Palantir Technologies Inc., Palo Alto, CA (US)

(72) Inventors: Peter Wilczynski, San Francisco, CA (US); Kendra Knittel, Redwood City, CA (US); Andrew Elder, New York, NY (US); Anand Gupta, New York, NY (US); Jessica Headrick, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/890,869

(22) Filed: Jun. 2, 2020

(65) Prior Publication Data

US 2021/0112312 A1 Apr. 15, 2021

Related U.S. Application Data

(60) Provisional application No. 62/914,927, filed on Oct. 14, 2019.

(51) Int. Cl.
*H04N 21/84* (2011.01)
*G06F 16/487* (2019.01)
*G06F 16/483* (2019.01)
*H04N 21/845* (2011.01)

(52) U.S. Cl.
CPC ........... *H04N 21/84* (2013.01); *G06F 16/483* (2019.01); *G06F 16/487* (2019.01); *H04N 21/8456* (2013.01)

(58) Field of Classification Search
CPC .. H04N 21/84; H04N 21/8456; G06F 16/487; G06F 16/16483; G06F 16/483
See application file for complete search history.

(56) References Cited

U.S. PATENT DOCUMENTS

| | | |
|---|---|---|
| 2005/0169367 A1 | 8/2005 | Venetianer et al. |
| 2015/0264296 A1 | 9/2015 | Devaux et al. |
| 2015/0294233 A1 | 10/2015 | Aultman et al. |
| 2016/0274743 A1* | 9/2016 | Sica ........................ G11B 27/24 |
| 2016/0307142 A1 | 10/2016 | Prabhakara et al. |
| 2017/0034583 A1* | 2/2017 | Long ..................... H04N 21/632 |
| 2018/0253491 A1 | 9/2018 | Moraleda et al. |
| 2019/0311616 A1* | 10/2019 | Jin ........................ G05D 1/0297 |
| 2019/0385449 A1* | 12/2019 | Pateropoulos ........... G08G 1/04 |
| 2020/0042557 A1* | 2/2020 | Kudryavtsev ......... G06F 16/383 |

OTHER PUBLICATIONS

Extended European Search Report for EP Application No. 20201645.7 dated Jan. 21, 2021, 7 pages.

* cited by examiner

*Primary Examiner* — Mishawn N. Hunter
(74) *Attorney, Agent, or Firm* — Sheppard Mullin Richter & Hampton LLP

(57) ABSTRACT

Systems and methods are provided for analyzing data snippets. One or more snippets can be associated with a data object of an enterprise data platform. The one or more snippets can be organized based on metadata information associated with the one or more snippets. The organized snippets can be analyzed to determine an activity relating to an entity depicted in the one or more snippets.

20 Claims, 11 Drawing Sheets

SYSTEMS AND METHODS FOR GENERATING, ANALYZING, AND STORING DATA SNIPPETS

CROSS-REFERENCE TO RELATED APPLICATION

This application claims the benefit of U.S. Provisional Application No. 62/914,927, filed Oct. 14, 2019, the content of which is incorporated herein by reference in its entirety.

FIELD OF THE INVENTION

This disclosure relates to approaches for generating, analyzing, and storing data snippets from data files.

BACKGROUND

Various data are being generated, collected, and/or archived every day. Reviewing or investigating events in a data file, such as a video feed, audio clip, image, document, and/or location data can be laborious. In some instances, when significant or insightful events occur during playback of a data file, a user reviewing the data file may need to document or keep track of timelines corresponding to the events. In such instances, the user may need to pause the data file to document or track the events. Accordingly, under current approaches, reviewing or investigating events in a data file can be cumbersome, ineffective, and time consuming.

SUMMARY

Various embodiments of the present disclosure can include systems, methods, and non-transitory computer readable media configured to generate and store snippets. A data file can be obtained from a data source through a plug-in interface. The data file can be played to a user through an application running on a computing device. An indication can be received from the user, through the application, to tag an entity depicted in the data file during playback of the data file. A snippet of the data file can be stored, wherein the snippet is a portion of the data file corresponding to the entity tagged by the user.

In some embodiments, the data file can be at least one of a video feed, audio clip, or image.

In some embodiments, one or more entities depicted in the data file can be identified. Information relating to the identified entities can be obtained from a source. The obtained information can be overlaid, thought the application, during playback of the data file.

In some embodiments, the obtained information can be at least one of geospatial or identification information associated with the entities. The source can be data objects in an enterprise data platform.

In some embodiments, a histogram can be provided, synchronously, through the application, during playback of the data file.

In some embodiments, the histogram can comprise one or more bars, each bar representing a number of entities depicted in the data file in a given time period.

In some embodiments, an option for the user to add annotations to the snippet can be provided. The annotations can be saved as part of metadata information of the snippet.

In some embodiments, the metadata information of the snippet can further include timestamp information, location information, and timeline information associated with the data file.

In some embodiments, the portion of the data file corresponding to the entity tagged can be user adjustable.

In some embodiments, the snippet can be stored to a data store in accordance with a data type of the snippet. The snippet can be deleted from the data store upon a time period of inactivity.

Various embodiments of the present disclosure can include systems, methods, and non-transitory computer readable media configured to analyze snippets. One or more snippets can be associated with a data object of an enterprise data platform. The one or more snippets can be organized based on metadata information associated with the one or more snippets. The organized snippets can be analyzed to determine an activity relating to an entity depicted in the one or more snippets.

In some embodiments, transactional data can be augmented with the one or more snippets. The transactional data can include at least one of commerce transactions, ingress and egress transactions, network login transactions, or geolocation of IP addresses.

In some embodiments, the metadata information associated with the one or more snippets can include at least one of user annotations, timestamp information, and location information.

In some embodiments, the one or more snippets can be aligned based on their respective timestamp information. A timeline can be constructed based on the alignment of the one or more snippets. The timeline can be provided to a user accessing the enterprise data platform.

In some embodiments, the one or more snippets can be clustered based on their respective location information. The clustering can be provided to a user accessing the enterprise data platform.

In some embodiments, the one or more snippets can be displayed on spatial coordinates of a map. A path the entity traversed in a given time period can be determined based on the metadata information associated with the one or more snippets. The path can be presented on the map.

In some embodiments, location information associated with the one or more snippets can be determined. Places the entity visited can be identified based on the location information. Timestamp information associated with the one or more snippets can be determined. A timeline can be constructed based on the timestamp information. The path can be identified on the map based on the identified places and the timeline.

In some embodiments, the entity can be a person, vehicle, item, location, thing of interest depicted in the one or more snippets.

In some embodiments, the one or more snippets can be portions of one or more data files corresponding to the entity.

In some embodiments, a data file can include at least one of video feeds, audio clips, or images.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
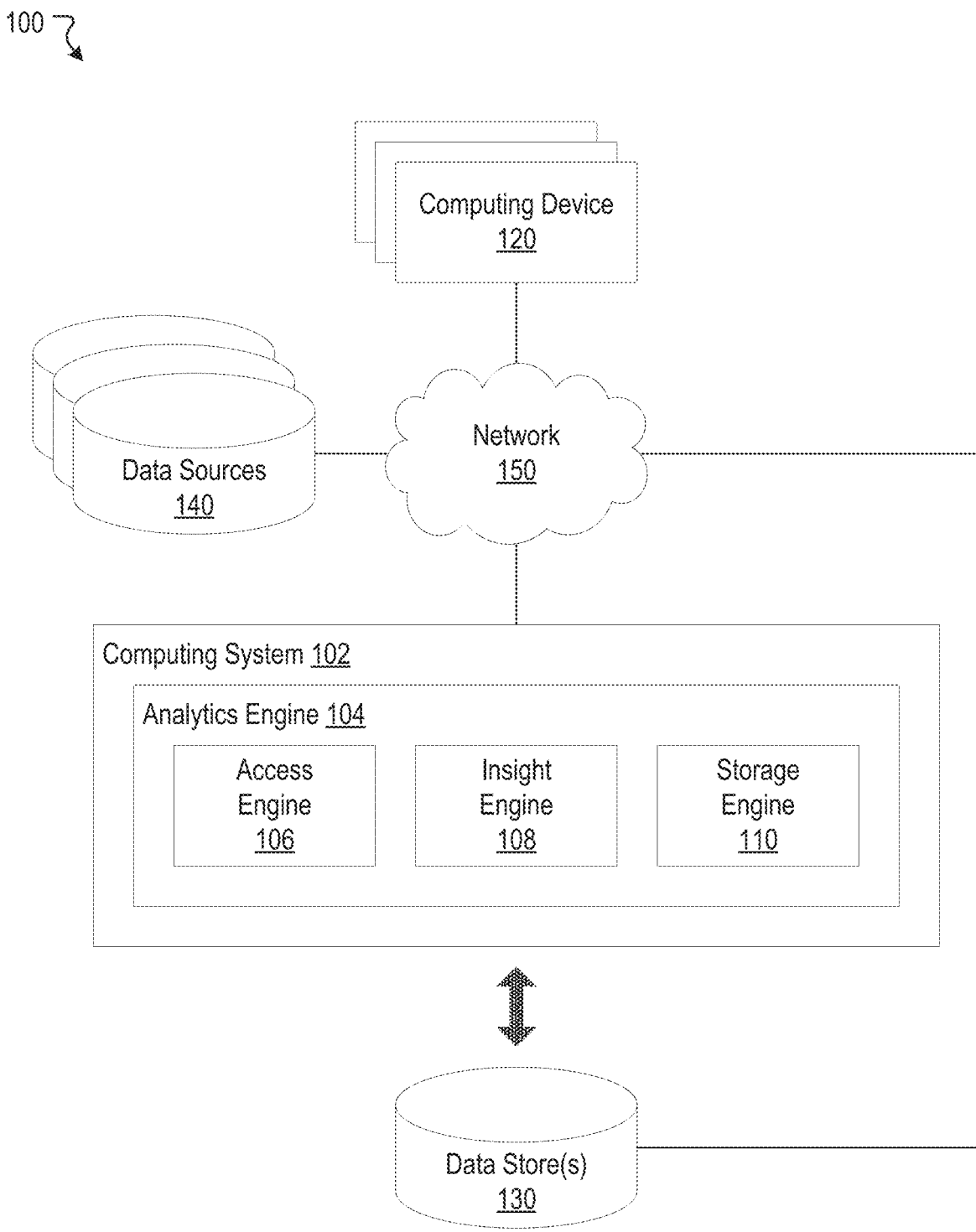
FIG. 1 illustrates an example computing environment, in accordance with various embodiments.

Various data are being generated, collected, and/or archived every day. Reviewing or investigating events in a data file, such as a video feed, audio clip, image, document, and/or location data can be laborious. For example, in a ten-hour long video feed, there could be hours of video that are either uneventful or uninteresting. In some instances, when significant or insightful events occur in a video feed, a user reviewing the video feed may need to document or keep track of timelines corresponding to the occurring events. In such instances, the user may need to pause the video feed to document or track the occurring events. Accordingly, under current approaches, reviewing or investigating events in a data file can be cumbersome, ineffective, and time consuming.

Furthermore, in general, data files tend to have large file sizes and may contain significant amounts of information that is irrelevant to an investigation. For example, an hour-long video feed may only contain a few minutes worth of relevant information. As another example, a high resolution satellite image may only contain some pixels worth of important information. Accordingly, under current approaches, archiving these data files in their entirety can be an inefficient use of available storage.

A claimed solution rooted in computer technology overcomes problems specifically arising in the realm of computer technology. In various embodiments, a data file, such as a video feed, audio clip, image, document, and location data, can be accessed through an application (e.g., a web application, web browser, etc.) running on a computing system. The application can present (or playback) information associated with the data file to a user operating the computing system. For example, the application can display or play content of a video feed to a user accessing the video feed through the application. In some embodiments, the application can allow a user to interact with a data file. For example, the user may zoom or pan (e.g., moving left, right, up, or down) a video feed while the video feed is being played. In some embodiments, the user can tag entities (e.g., persons, vehicles, items, locations, things of interest) or events, or an event containing specified entities, depicted in a data file during playback of the data file. For example, during playback of a video feed, a user can tag a person depicted in the video feed. Once tagged, a portion of the data file (e.g., a snippet) corresponding to the tagged entity can be saved or archived. In some embodiments, the user can add annotations (e.g., text) describing the entity as part of the snippet. In some embodiments, during playback of a data file, the application can include a histogram that indicates a number of objects present in a given video frame of the data file. For example, the application can determine a number of persons, a number of vehicles, and a number of trees present in a given video frame of a video feed, and display this information as a histogram during playback of the video feed. The application, in various embodiments, can use commonly known image recognition or computer vision techniques to identify entities depicted in a video frame.

In some embodiments, snippets obtained from various data files can be analyzed. The snippets can be associated with data objects of an enterprise data platform. Once the snippets are associated with the data objects, the snippets can be maneuvered or manipulated in the enterprise data platform. For example, in some embodiments, the snippets can be aligned based on their respective metadata information, such as timestamp. In some embodiments, snippets from different data file types can be aligned temporally. For example, a snippet from a video feed can be aligned with a snippet from an audio clip based on their respective timestamps. In some embodiments, snippets can be augmented with transactional data such as credit card transactions. In general, by aligning snippets with one other and/or augmenting the snippets with transactional data, temporally, in accordance with their timestamps, a general trend about entities may emerge. For example, various snippets about a shipping truck can be aligned and analyzed within the enterprise data platform to determine locations of where the shipping truck has been or activities the shipping truck had performed on a given day. In some embodiments, pixels coordinates of snippets can be extracted and converted to geospatial coordinates to trace a path an entity took on a given day using generally know techniques, such as geo-rectification.

In some embodiments, the enterprise data platform can include a data storage engine. The data storage engine, in some embodiments, can be configured to obtain various data files from various data sources through a plug-in interface (e.g., an application programmable interface) provided by each data source. In some embodiments, the data storage engine may comprise a fast-access storage (e.g., hot storage) and a slow-access storage (e.g., cold storage). When the data storage engine obtains a data file from a data source, the data file is stored in the fast-access storage initially. Such fast-access storage allows the user to have quick access to the data file, for example, to view the data file, to tag entities or events, or an event containing specified entities, depicted in the data file, and to save snippets corresponding to the tagged entities during playback of the data file. Once the viewing is complete, the snippets are stored in the slow-access storage in accordance with data types of the snippets. In some embodiments, the data storage engine can implement a data retention policy in which if snippets are not accessed for some time period, the snippets are purged or deleted from the data storage engine. In some embodiments, snippets of a data file are stored in hot storage while the remaining non-snippet portions of the data file are stored in cold storage. Various embodiments of the claimed invention are discussed below.

FIG. 1 illustrates an example environment 100, in accordance with various embodiments. The example environment 100 can include at least one computing system 102 that includes one or more processors and memory. The processors can be configured to perform various operations by interpreting machine-readable instructions. In some embodiments, the example environment 100 may be implemented as an enterprise data platform. In some embodiments, the example environment 100 may be configured to interact with computing systems of an enterprise data platform. In various embodiments, computing systems of the enterprise data platform may store and manage various data as data objects in one or more data object graphs. A data object graph may be made up of a number of data objects that serves as containers for data. Each data object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the data object graph can include different types of data objects. For example, a data object may represent an entity (e.g., person(s), place(s), thing(s), etc.), an activity (e.g., event, incident, etc.), a document, or multimedia. In some embodiments, data corresponding to such data object graphs is stored and accessible through one or more data stores 130.

In some embodiments, the example environment 100 can include one or more data sources 140. In general, a data source may be a data repository in which data files can be stored and from which data files can be retrieved by computing systems of the enterprise data platform through application programmable interfaces (e.g., APIs) or other commonly known methods. In some embodiments, the computing systems can access data files stored in the data sources 140 over a network 150 and associate data in the data files with one or more data objects of the enterprise data platform. The data files stored in the data sources 140, in some embodiments, may comprise various content items, such as video, audio, images, text, or other suitable data files. For example, the data sources 140 may store video feeds recorded from a closed-circuit television, a drone, a mobile device, or any other suitable video recording devices. As another example, the data sources 140 may store audio clips recorded from any suitable audio recording devices. In some embodiments, the data sources 140 may also store transactional data. For example, the data sources 140 may store transactional data relating to commerce transactions (e.g., credit card transactions), badge reader transactions for ingress and egress at a location (e.g., facility), network login transactions, and/or geolocation of IP addresses (e.g., internet protocol addresses).

In some embodiments, the computing system 102 can include an analytics engine 104. The analytics engine 104 can include an access engine 106, an insight engine 108, and a storage engine 110. The analytics engine 104 can be executed by the processor(s) of the computing system 102 to perform various operations including those operations described in reference to the access engine 106, the insight engine 108, and the storage engine 110. In general, the analytics engine 104 can be implemented, in whole or in part, as software that is capable of running on one or more computing devices or systems. In one example, the analytics engine 104 may be implemented as or within a software application running on one or more computing devices (e.g., user or client devices) and/or one or more servers (e.g., network servers or cloud servers). In some instances, various aspects of the analytics engine 104, the access engine 106, the insight engine 108, and the storage engine 110 may be implemented in one or more computing systems and/or devices. The environment 100 may also include one or more data stores 130 accessible to the computing system 102. In general, a data store may be any device in which data can be stored and from which data can be retrieved. The data stores 130 may be accessible to the computing system 102 either directly or over the network 150. The network 150 may be any wired or wireless network through which data can be sent and received (e.g., the Internet, local area network, etc.). In some embodiments, the data stores 130 can store various data that can be accessed by the analytics engine 104 to provide the various features described herein. For example, as mentioned, the data stores 130 can store object graph data in which information describing objects corresponding to various geographic regions (or locations) is stored and accessible.

The access engine 106 can be configured to provide an user interface (e.g., a graphical user interface) through which data files from the data sources 140 can be accessed. For example, the user interface can be provided by a software application (e.g., data analytics application, web browser, etc.) running on a computing device 120 and through a display screen of the computing device 120. The user interface can provide users with access to various data files from the data sources 140 through the computing system 102. For example, a video feed from the data sources 140 can be loaded (e.g., downloaded) to the computing system 102. In this example, a user operating the computing device 120 can request to access the video feed through the computing system 102. As another example, the user can request to access an audio clip from the data sources 140 through the computing system 102. In some embodiments, the access engine 106 can allow users to interact with data files during playback of the data files. For example, a user can zoom or pan a video feed during playback of the video feed. In some embodiments, the access engine 106 can allow users can tag entities (e.g., persons, vehicles, items, locations, things of interest) or events, or an event containing specified entities, that may appear during playback of data files. For example, during playback of a video feed, a user can tag an entity depicted in the video feed. Once tagged, portions (e.g., snippets) of the data files corresponding to the tagged entities can be saved or archived. In some embodiments, the access engine 106 allows users to add annotations (e.g., text) describing a tagged entity as part of a snippet to be saved. In some embodiments, the access engine 106 can display a histogram indicating a number of entities present during playback of data files. More details describing the access engine 106 will be provided below in reference to FIG. 2A.

The insight engine 108 can be configured to determine one or more activities associated with an entity based on snippets. In some embodiments, the insight engine 108 can associate snippets with one or more data objects of the enterprise data platform. For example, snippets relating to a person can be associated with a data object corresponding to the person in the enterprise data platform. Once snippets are associated with a data object, the snippets can be maneuvered or manipulated through the insight engine 108 to determine activities associated with an entity. In some embodiments, the insight engine 108 can organize snippets based on their metadata information. For example, a first snippet and a second snippet can be aligned temporally based on timestamps of each snippet. In some embodiments, the insight engine 108 can align snippets from different data files. For example, a snippet from a video feed can be aligned with a snippet from an audio clip based on their respective timestamps. In some embodiments, the insight engine 108 can augment snippets with transactional data. In some embodiments, the insight engine 108 trace a path an entity traversed on a given day based on snippets. More details describing the insight engine 108 will be provided below in reference to FIG. 2B.

In some embodiments, the storage engine 110 can be configured to obtain various data files from the data sources 140. The storage engine 110 can obtain data files from the data sources 140 through a plug-in interface (e.g., an application programmable interface) provided by each data source. In some embodiments, the storage engine 110 may comprise a fast-access storage (e.g., hot storage) and a slow-access storage (e.g., cold storage). When the storage engine 110 obtains a data file from a data source, the data file is loaded in the fast-access storage initially. Such fast-access storage allows a user to have quick access to the data file, for example, to view the data file, to tag entities or events, or an event containing specified entities, depicted in the data file, and to save snippets corresponding to the entities depicted in the data file during playback. Once viewing is complete, the snippets are transferred to the slow-access storage. The slow-access storage can determine data types associated with the snippets and store the snippets in accordance with their data types. In some embodiments, the storage engine 110 can implement a data retention policy in which if a snippet is not accessed for some period of time, the snippet will be purged or deleted from the slow-access storage. More details describing the storage engine 110 will be provided below in reference to FIG. 2C.

Figure 2A:
FIG. 2A illustrates an example access engine, in accordance with various embodiments.

FIG. 2A illustrates an example access engine 202, in accordance with various embodiments. The access engine 202 may be implemented as the access engine 106 of FIG. 1. As discussed, in some embodiments, the access engine 202 can be configured to provide a user interface through which users can access and interact with various data files from data sources (e.g., the data sources 140 of FIG. 1). In some embodiments, the access engine 202 can include an interaction engine 204, a histogram engine 206, and a tagging engine 208.

The interaction engine 204 can be configured to allow users to interact with data files. For example, in some embodiments, the interaction engine 204 can provide options for a user to control playback of a data file. For instance, the interaction engine 204 can provide options for the user to play, pause, forward, and/or rewind a video feed while the video feed is being played through the user interface. In some embodiments, the interaction engine 204 can provide options for a user to zoom and/or pan (e.g., moving left, right, up, or down) during playback of a data file. For example, the user can zoom and/or pan a video feed during playback of the video feed through the user interface. As another example, the user can zoom and/or pan a high resolution satellite image while the image is being displayed on the user interface. In some embodiments, the interaction engine 204 may allow a user to overlay geospatial or identification information associated with entities depicted in a data file during playback of the data file. For example, during playback of a video feed, entity identification information (e.g., a person's name, a vehicle's make and model, business names, etc.) can be displayed, as overlays, alongside entities depicted in the video feed. In some embodiments, the interaction engine 204 can use any commonly known image recognition or computer vision techniques to identify geospatial or identification information. For example, using image recognition techniques, the interaction engine 204 can identify a person, a vehicle, a tree during playback of a video feed and overlay this information in the video feed in real-time or near real-time. As another example, using computer vision techniques, the interaction engine 204 may identify roads, airports, or other infrastructures and display their geospatial coordinates. In some embodiments, the interaction engine 204 may leverage data stored in data objects of an enterprise data platform to provide the geospatial or identification information. For example, based on data stored in data objects of the enterprise data platform, the interaction engine 204 may determine a person depicted in a video feed to be a particular person. As another example, based on data stored in data objects of the enterprise data platform, the interaction engine 204 may determine a particular location depicted in a video feed to be a particular business entity.

The histogram engine 206 can be configured to present a histogram during playback of a data file. A histogram, as used in this document, denotes an x-y plot comprising a series of bars with each bar representing a specific length of elapsed time (e.g., a time period) during playback of a data file. For example, each bar can correspond to one minute of elapsed time during playback of a video feed. As another example, each bar can correspond to five minutes of elapsed time during playback of an audio clip. The height (e.g., magnitude) of each bar represents a number of entities present for a given time period during playback of the data file. For example, during a playback of a video feed, the video feed depicts a person and a vehicle during a first time period. In this example, a number of entities depicted in the video feed for the first time period is two and, thus, a height of a bar corresponding to the first time period would be two. As another example, during playback of the same video feed, in a second time period immediately following the first time period, the video feed further depicts a second vehicle, in addition to the person and the vehicle depicted during the first time period. In this second example, a height of a bar corresponding to the second time period would be three. In various embodiments, the histogram engine 206 can use any commonly known image recognition or computer vision techniques to determine a number of entities depicted in data files for a given time period. For example, using image recognition or computer vision techniques, the histogram engine 206 can identify a person, a vehicle, a tree for a given time period during playback of a video feed. In some embodiments, instead of determining a number of entities for a given time period by itself, the histogram engine 206 can obtain the number of entities information from the interaction engine 204, as discussed above. In some embodiments, the histogram engine 206 can synchronously present a histogram alongside a timeline of a data file during playback of the data file. For example, during playback of a video feed, the user interface can display a timeline for the video feed. In this example, a histogram for the video feed can be presented immediately above or below the timeline on the user interface with each bar of the histogram corresponding to a time period elapsed as indicated by the timeline.

The tagging engine 208 can be configured to allow users to tag entities or events, or an event containing specified entities, depicted in data files during playback of the data files. For example, during playback of a video feed, a user may tag one or more entities, such as a person, an object, etc., depicted in the video feed. As another example, a user may tag one or more events, such as a vehicle accident, an exchange of goods between parties, etc., depicted in a video feed. In some cases, a user can tag an event and entities involved in the event depicted in a video feed. For example, during playback of a video feed, a user observes an exchange of illicit goods between two people. In this example, the user can tag the exchange and the two people involved in the exchange. Many variations are possible. In some embodiments, once tagged, the tagging engine 208 can save a portion of a data file (e.g., a snippet) corresponding to an entity depicted during playback of the data file. For example, in the example above, the tagging engine 208 can save snippets of the video feed that correspond to the one or more entities tagged by the user. In some embodiments, a snippet's size is user adjustable. For example, a user can increase a size of a snippet to save a larger portion of a data file. In some embodiments, tagging engine 208 can allow a user to annotate a snippet. For example, a user can add a brief description to describe a snippet resulting from tagging an entity. For instance, the user tags a vehicle depicted in a video feed during playback of the video feed. In this instance, the user recognizes make and model of the vehicle, and thus, annotates the snippet associated with the vehicle with information regarding the vehicle's make and model. As another example, a user listens to an audio clip and decides to tag a portion of the audio clip as a snippet. In this example, the user recognizes the person speaking in the audio clip and annotates the snippet with identification information of the speaker. In some embodiments, a snippet can include various metadata information associated with a data file from which the snippet is tagged. Such metadata information can include timestamp information, location information, and/or timeline information associated with the data file. More details describing the interaction engine 204, the histogram engine 206, and the tagging engine 208 will be provided below in reference to FIG. 3A.

Figure 2B:
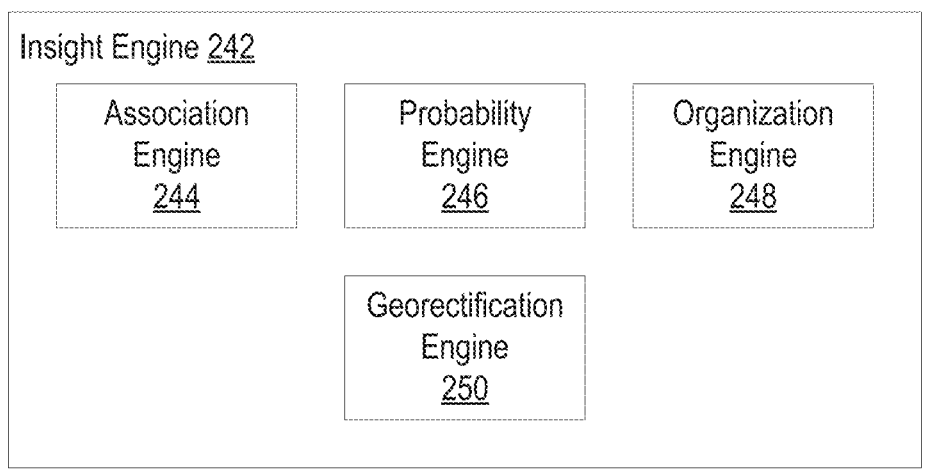
FIG. 2B illustrates an example insight engine, in accordance with various embodiments.

FIG. 2B illustrates an example insight engine 242, in accordance with various embodiments. The insight engine 242 may be implemented as the insight engine 108 of FIG. 1. As discussed, in some embodiments, the insight engine 242 can be configured to determine one or more activities associated with an entity based on snippets. In some embodiments, the insight engine 242 can include an association engine 244, a probability engine 246, an organization engine 248, and a georectification engine 250.

The association engine 244 can be configured to associate snippets with data objects of an enterprise data platform. In general, snippets are associated with entities depicted in data files during playback of the data files. These snippets, thus, are data that can be associated with data objects. For example, a data object associated with an entity can be created within the enterprise data platform to gather and cluster data relating to the entity. In this example, a user, during playback of a data file, identifies the entity, tags the entity, and saves a snippet of the data file corresponding to the entity. In this example, the association engine 244, based on metadata information associated with the snippet and/or annotation of the entity provided by the user, can associate the snippet with the data object. In some embodiments, the association engine 244 may use commonly known image recognition and/or computer vision techniques to identify entities depicted in snippets and automatically suggest associations between the snippets and data objects corresponding to the entities depicted in the snippets. In some embodiments, the association engine 244 can associate transactional data with data objects. For example, commerce transaction records relating to a person can be associated with a data object corresponding to the person. As another example, ingress and egress records relating to the person at a given location (e.g., facility) can be associated with the data object corresponding to the person. Many variations are possible. For example, wireless network login records relating to the person can also be associated with the data object. In some embodiments, the association engine 244 can add one or more attributes to a data object to link the data object to snippets or transactional data. Once data (e.g., snippets and transactional data) are clustered into data objects, the data objects can be manipulated within the enterprise data platform to gain various insights about entities.

The probability engine 246 can be configured to determine a probability of a particular entity of interest being depicted in a snippet. The probability engine 246 can determine the probability using any commonly known techniques. For example, in some embodiments, the probability engine 246 can compare a person depicted in a snippet with a database of known images. In this example, the probability engine 246 can compute a probability that the person depicted in the snippet corresponds to a known image in the database. As another example, in some embodiments, the probability engine 246 can decipher, using computer vision, a license plate number of a vehicle depicted in a snippet and compare the deciphered license plate number with a database of license plate numbers. In this example, the probability engine 246 can compute a probability that the deciphered license plate number matches a license plate number in the database. In some embodiments, when a probability of an entity depicted in a snippet matching a known entity satisfies a certain threshold value, the probability engine 246 can automatically associate the snippet with a data object corresponding to the know entity through the association engine 244, as discussed above.

The organization engine 248 can be configured to organize snippets associated with a data object based on their metadata information. Metadata information, in various embodiments, can include user annotation, location information, timestamp information, and information relating to devices used to capture data files from which the snippets are tagged. In some embodiments, the organization engine 248 can align snippets based on their respective timestamp information. For example, a first snippet and a second snippet can be aligned temporally based on timestamps of each snippet. In some embodiments, the organization engine 248 can align snippets from different data files based on their respective timestamp information. For example, a snippet from a video feed can be aligned with a snippet from an audio clip based on their respective timestamps. As another example, a snippet from a video feed can be aligned with a snippet from an image based on their respective timestamps. In some embodiments, the organization engine 248 can cluster snippets based on their respective location information. For example, a first snippet depicting an entity captured at location X on a particular day and a second snippet depicting the same entity and captured at the same location X but on a different day can be clustered based on their captured location (e.g., location X). In some embodiments, the organization engine 248 can augment snippets with transactional data. For example, a snippet of a video feed showing a person purchasing an item using a credit card can be augmented with credit card transaction data based on their respective timestamps to, for example, confirm the purchase. Once snippets are aligned, clustered, or augmented with transactional data, various activities associated with an entity depicted in the snippets can be determined. For example, when the snippets are aligned based on their respective timestamp information by the organization engine 248, a timeline of where the entity had been can be constructed based on the aligned snippets. For instance, a first snippet depicts a person at location X at a first time on a given day and a second snippet depicts the person at location B at a second time, after the first time, on the given day. Based on this information, a timeline of where the person had been can be constructed for the given day. As another example, when the snippets are clustered based on their respective location information by the organization engine 248, locations the entity most frequents can be determined. As yet another example, a snippet depicts an entity at a location with wireless network access (e.g., internet). In this example, the snippet can be augmented with transactional data, such as network login data, to either confirm affirm or disaffirm presence of the entity at the location. Mary variations are possible. For example, the organization engine 248 can organize snippets based on their respective timestamp and location information. In this example, based on this organization, the insight engine 242 can determine locations an entity depicted in the snippets is most likely to visit on a particular day at a particular time—a pattern or a routine associated with the entity. More details describing the organization engine 248 will be provided below in reference to FIG. 3B.

The georectification engine 250 can be configured to display snippets in spatial coordinates of a map. For example, snippets can be layered, as overlays, on top of a map. In general, georectification is a process in which data (e.g., image, video, audio, etc.) that does not have spatial coordinates (e.g., longitude and latitude values) is placed or layered onto a known spatial reference system such as a map. This process can involve determining spatial coordinates of a video or image (e.g., a snippet) through use of sensor data (e.g., GPS) or sometimes mathematical computations, and placing the video or image onto a map based on the determined spatial coordinates. One such mathematical computation, for example, can involve comparing outlines of an object, such as a building, in a video or image to a reference video or image with known spatial coordinates to determine spatial coordinates of the object. Therefore, the georectification engine 250 can determine spatial coordinates of a snippet based on entities, events, or an event containing specified entities depicted in the snippet, and place the snippet onto a map according to its spatial coordinates. For example, a snippet of an aerial image depicts a specific intersection in a city. In this example, the georectification engine 250 can determine spatial coordinates of the snippet based on the intersection and overlay the snippet onto a region in a map of the city that corresponds to where the snippet was captured. In this example, a user accessing the snippet can view dimensions of the snippet in relation to the map. As another example, the georectification engine 250 can analyze a snippet of an aerial video feed depicting a vehicle entering an intersection, determine spatial coordinates of the snippet based on the vehicle or the intersection, and overlay the snippet onto a map to show a location of the vehicle on the map in relation to other landmarks or snippets displayed on the map. In some embodiments, the georectification engine 250 can georectify a plurality of snippets associated with an entity onto a map. In such embodiments, the georectification engine 250 can provide a visualization on the map of where the entity had been on a given day and trace out a path the entity visited on the given day. More details describing the georectification engine 250 will be provided below in reference to FIG. 3C.

Figure 2C:
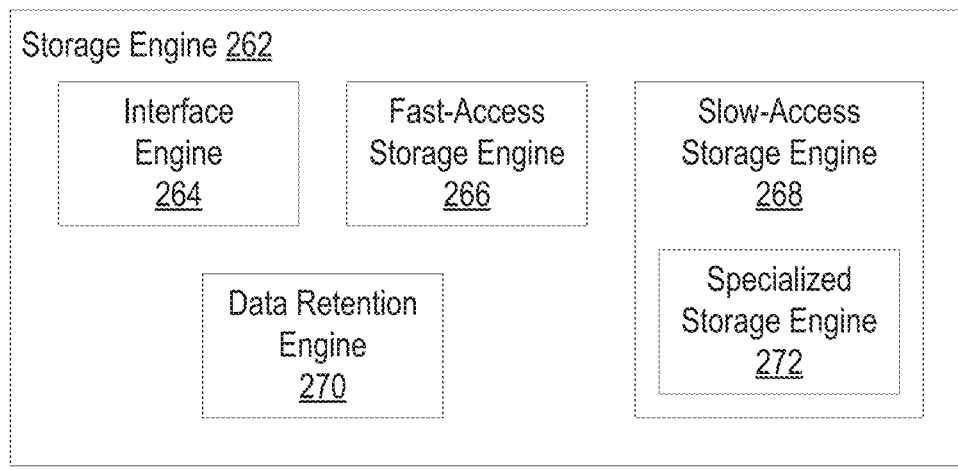
FIG. 2C illustrates an example storage engine, in accordance with various embodiments.

FIG. 2C illustrates an example storage engine 262, in accordance with various embodiments. The storage engine 262 may be implemented as the storage 110 of FIG. 1. As discussed, in some embodiments, the storage engine 262 can be configured to obtain various data files from various data sources (e.g., the data sources 140 of FIG. 1) and store the data files while the data files are being accessed. In some embodiments, the storage engine 262 can store snippets for later use and delete snippets in accordance with a data retention policy. In some embodiments, the storage engine 262 can include an interface engine 264, a fast-access storage engine 266, a slow-access storage engine 268, and a data retention engine 270.

The interface engine 264 can be configured to obtain data files from which snippets are generated from various data sources. The interface engine 264 can obtain data files from data sources through one or more plug-in interfaces (e.g., application programmable interfaces), with each plug-in interface corresponding to a data source. In general, data files obtained from data sources are heterogenous, meaning, the data files are of different data types. For example, data files can be video, audio, images, and/or transactional sensor data (e.g., credit card transactions, ingress and egress data from a badge reader, etc.). The interface engine 264, thus, is configured to handle data files of various data types.

The fast-access storage engine 266 can be configured to store data files while the data files are being manipulated in an enterprise data platform. Once data files are obtained by the interface engine 264, the data files are stored in the fast-access storage engine 266. In general, the fast-access storage engine 266 can be a hot storage system comprising solid state memory (e.g., solid state drives or SSDs). By storing data files in the fast-access storage engine 266, a user accessing the enterprise data platform can have quick access to the data files, for example, to view the data files, to tag entities or events, or an event containing specified entities, depicted in the data files, and to save snippets of the data files corresponding to the tagged entities.

The slow-access storage engine 268 can be configure to store snippets that are tagged from data files. In general, the slow-access storage engine 268 can be a cold storage system comprising one or more data stores, with each data store having at least one hard drive disk for storing snippets. In some embodiments, the slow-access storage engine 268 can include a specialized storage engine 272. The specialized storage engine 272 can determine a data type associated with each snippet that is tagged. For example, for a snippet from a video feed, the specialized storage engine 272 can determine the snippet to be associated with video data type. As another example, for a snippet from a high resolution satellite image, the specialized storage engine 272 can determine the snippet to be associated with image data type. In some embodiments, the specialized storage engine 272 can store snippets of a particular data type to a data store for that particular data type. For example, snippets that are associated with video are stored in a data store specifically for video snippets. As another example, snippets that are associated with audio are stored in a data store specifically for audio snippets. In some embodiments, the specialized storage engine 272 can optimize storage of snippets based on common user access pattern. For example, when a user accesses snippets tagged from a high resolution satellite image, only the snippets are displayed in their original high resolution format. Other regions of the satellite image are "grayed out" when accessed because these regions are uninteresting or unimportant. This storage scheme ensures that file sizes associated with snippets are optimized for each data type.

The data retention engine 270 can be configured to implement data retention policies for snippets. In some embodiments, the data retention engine 270 can define a default data retention policy. For example, if snippets are not accessed for a default time period (e.g., thirty days), the snippets are automatically purged or deleted from the slow-access storage engine 268. In some embodiments, the data retention policy can be user defined. For example, a user can define a time period of inactivity (e.g., fifteen days, sixty days, etc.) before the snippets are purged or deleted from the slow-access storage engine 268. In some embodiments, the data retention policy can be individualized based on snippet data types. For example, a user can define a first time period of inactivity for snippets that are video and a second time period of inactivity for snippets that are audio. In this example, the data retention engine 270 can purge or delete snippet of the two data types at different times. More details describing the fast-access storage engine 266, the slow-access storage engine 268, the specialized storage engine 272, and the data retention engine 270 will be provided below in reference to FIG. 3D.

Figure 3A:
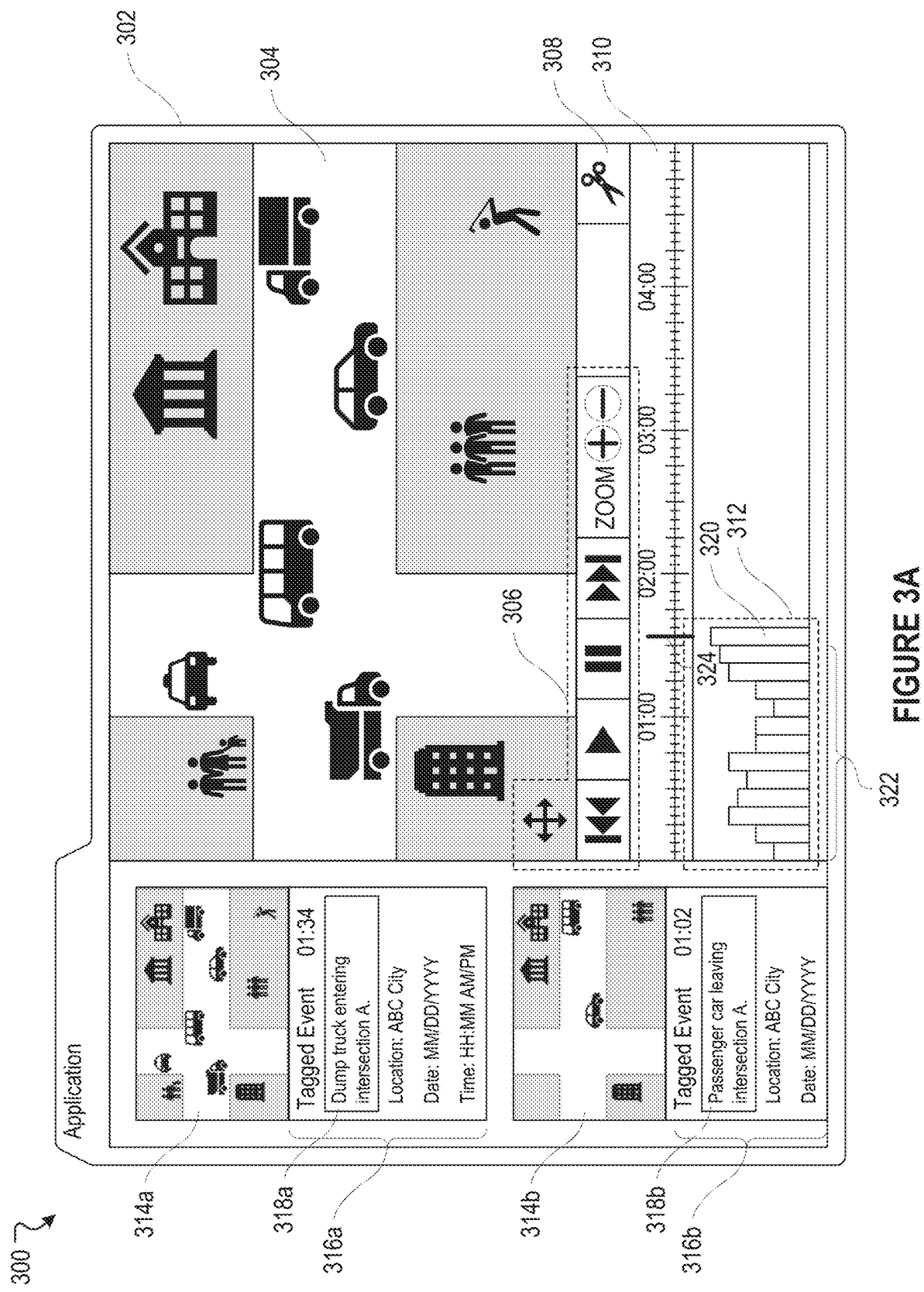
FIG. 3A illustrates an example user interface through which data files from data sources can be accessed, in accordance with various embodiments.

FIG. 3A illustrates an example user interface 300 through which data files from data sources can be accessed, in accordance with various embodiments. In various embodiments, the user interface 300 may be provided through a software application 302 (e.g., data analytics application, web browser, etc.) running on a computing device. In this example, a user operating the computing device can access a video feed 304 from a data source through the software application 302. Although a video feed is depicted in this example user interface 300, in some embodiments, other data files, such as audio clips, images, mapping information may be accessed through the software application 302. In some embodiments, the software application 302 can include a set of control elements 306 and a snippet element 308. The user can control playback of the video feed 304 through the set of control elements 306. For example, the user may interact with the "rewind," "play," "pause," or "forward" control element to rewind, play, pause, or forward the video feed 304, respectively. In some cases, the user can zoom during playback of the video feed 304. For example, the user may interact with the "+" and "−" control elements to zoom in or out of the video feed 304. In some cases, the user can pan around the video feed 304 during playback using the "arrow" control element as shown. While accessing the video feed 304, the user may see an entity (e.g., a person, a vehicle, a building, a thing, etc.) that the user may want to tag. In such scenarios, the user may interact with the snippet element 308 to save a portion of the video feed 304 (e.g., a snippet) that depicts the entity. In this example, the user has tagged two entities and saved two snippets 314a and 314b corresponding to the two entities. For instance, as shown, the snippet 314a corresponds to a "dump truck" and the snippet 314b corresponds to a "passenger car." Each snippet can include various metadata information (e.g., 316a and 316b) associated with the video feed 304. These metadata information can include location information (e.g., "ABC City"), timestamp information (e.g., "date" and "time"), and elapse time of the video feed 304 (e.g., "Tagged Event"). In some cases, the user may added annotations (e.g., 318a and 318b) to describe entities (e.g., the "dump truck" and the "passenger car") being depicted in each snippet. In some embodiments, the user may click or press the snippets 314a and 314b, and in response, the software application 302 may replay the snippets 314a and 314b.

In some embodiments, the software application 302 can further include an elapsed timeline 310 and a histogram 312. The elapsed timeline 310 can display a duration of the video feed 304, currently being accessed through the software application 302. The elapsed timeline 310 can further include an indication 324 indicating a time location of the video feed 304. The histogram 312 can indicate, in real-time or near real-time, a number and/or category of entities depicted in a video frame of the video feed 304. For example, the video frame currently shown in the user interface 300 depicts three buildings, five vehicles, and three sets of persons. The number of entities depicted, thus, is eleven, and the respective categories are "building", "vehicle", and "persons", and is indicated by a bar 320 of the histogram 312. Bars 322 previous to the bar 320 indicate a number and category of entities present in video frames prior to the video frame currently shown in the user interface 300. In various embodiments, any commonly known image recognition or computer vision techniques can be used to determine a number and/or category of entities depicted in a given video frame.

Figure 3B:
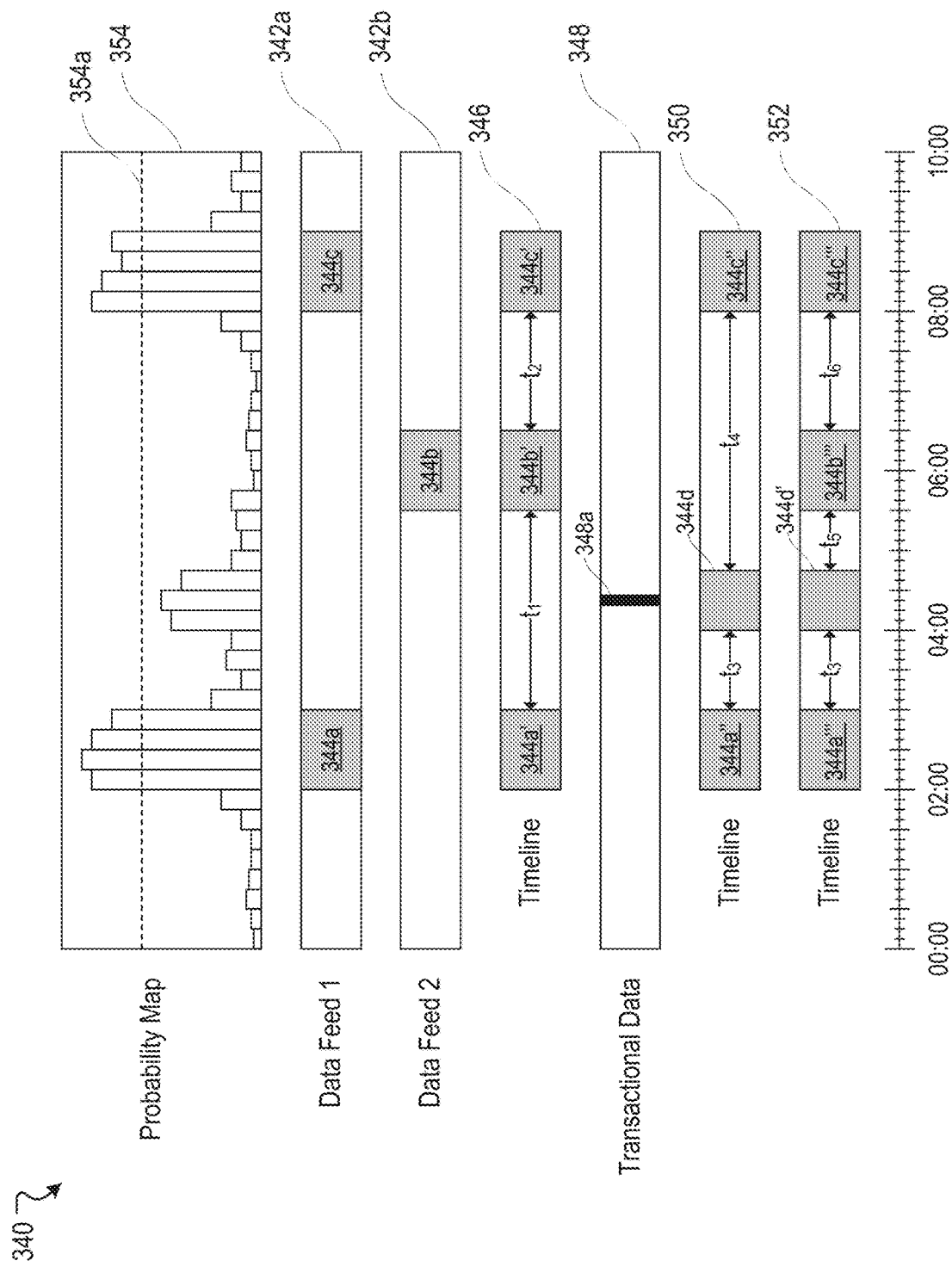
FIG. 3B illustrates a diagram in which snippets and various transactional data are analyzed to determine various activities associated with an entity, in accordance with various embodiments.

FIG. 3B illustrates a diagram 340 in which snippets and various transactional data are analyzed to determine various activities associated with an entity, in accordance with various embodiments. The diagram 340 shows data feeds 342a and 342b. In some embodiments, the data feeds 342a and 342b can be video feeds, audio clips, images, or any combinations thereof. The data feeds 342a and 342b can be accessed by a user through a software application (e.g., the software application 302 of FIG. 3A). In this example, the user while accessing the data feed 342a, tags an entity depicted in the data feed 342a at two different times. The software application, in response, saves portions of the data feed 342a where the user tagged the entity as snippets 344a and 344c. Also, in the example, the user, while accessing the data feed 342b, tags an entity (the same entity as in the data feed 342a) depicted in the data feed 342b. The software application, in response, saves a portion of the data feed 342b where the user tagged the entity as a snippet 344b. In some embodiments, the software application, upon receiving an instruction from the user, can align the snippets 344a, 344b, and 344c based on their respective timestamp information (e.g., the metadata information 316a and 316b of FIG. 3A) and construct a timeline 346 with the snippets 344a, 344b, and 344c (shown as 344a', 344b', and 344c'). In some cases, the software application can cluster the snippets 344a, 344b, and 344c based on their respective location information (not shown). Based on this timeline 346, the user may infer various insights about the entity. For example, the data feed 342a may correspond to a video feed of store ABC and the data feed 342b may correspond to a video feed of store XYZ. Further, in this example, the entity is a person. In this example, by aligning the snippets 344a, 344b, and 344c and constructing the timeline 346, the user interacting with the software application may infer that the person was at the store ABC at an initial time. After some time ("$t_1$"), the person went to the store XYZ. After another time ("$t_2$"), the person went back to the store ABC.

In some embodiments, a data feed can be associated with a probability map 354. In this example, the probability map 354 is associated with the data feed 342a and displays a probability of a known entity being depicted in the data feed 342a. For example, when a user accesses the data feed 342a through the software application, the software application determines, in real-time or near real-time, whether an entity depicted in the data feed 342a is a known entity and calculates a probability for the determination. When the probability satisfies a threshold value 354a, the software application may suggest to the user to tag the known entity. In some cases, the software application can automatically tag the known entity. For example, continuing from the example discussed above, while the user is accessing the video feed (data feed 342a) of the store ABC through the software application, the software application identifies the person depicted in the video feed to be a known person using image recognition or computer vision. In this example, the software application may suggest to the user to tag the person or, in some cases, automatically tags the person and saves a portion of the video feed depicting the person as a snippet. In various embodiments, the software application may use various image recognition or computer vision techniques to identify entities and compare the entities to a database of known entities.

In some embodiments, when determining activities associated with an entity, the user may additionally instruct the software application to include transactional data 348. The transactional data 348, in various embodiments, can include commerce transactions (e.g., credit card transactions), badge reader transactions for ingress and egress, network login transactions, and/or geolocation of IP addresses (e.g., internet protocol addresses). In such embodiments, the software application can augment snippets (344a and 344b) with the transactional data 348 and construct a timeline 350 that includes both the snippets and the transactional data 348 to infer various insights. For example, continuing from the example discussed above, while the user is accessing the video feed (the data feed 342a) of the store ABC through the software application, the user sees a person of interest and tags the person. At some time later ("t₃"), the user is uncertain whether another person depicted in the video feed is the person of interest. In this case, the user can instruct the software application to include transactional data (e.g., credit card transactions) associated with the person of interest. If the credit card transaction information includes an indication 348a that indicates the person had purchased an item form the store ABC, there is high probability that the another person depicted previously was indeed the person of interest. Accordingly, a snippet 344d corresponding to the another person can be saved. Therefore, in the example, the timeline 350 constructed includes snippets 344a", 344d, and 344c".

In some cases, the software application can combine various snippets (e.g., the snippets 344a, 344b, and 344c) from various data streams (e.g., the data feeds 342a and 342b) with various transactional data (e.g., the transactional data 348) to construct a timeline 352 for the user to infer various insights. As illustrated in FIG. 3B, the timeline 352 is a timeline constructed based on the snippets 344a, 344b, and 344c (e.g., snippets 344a''', 344b''', and 344c'''), and the snippet 334d derived from the transaction data 348 (e.g., snippet 344d').

Figure 3C:
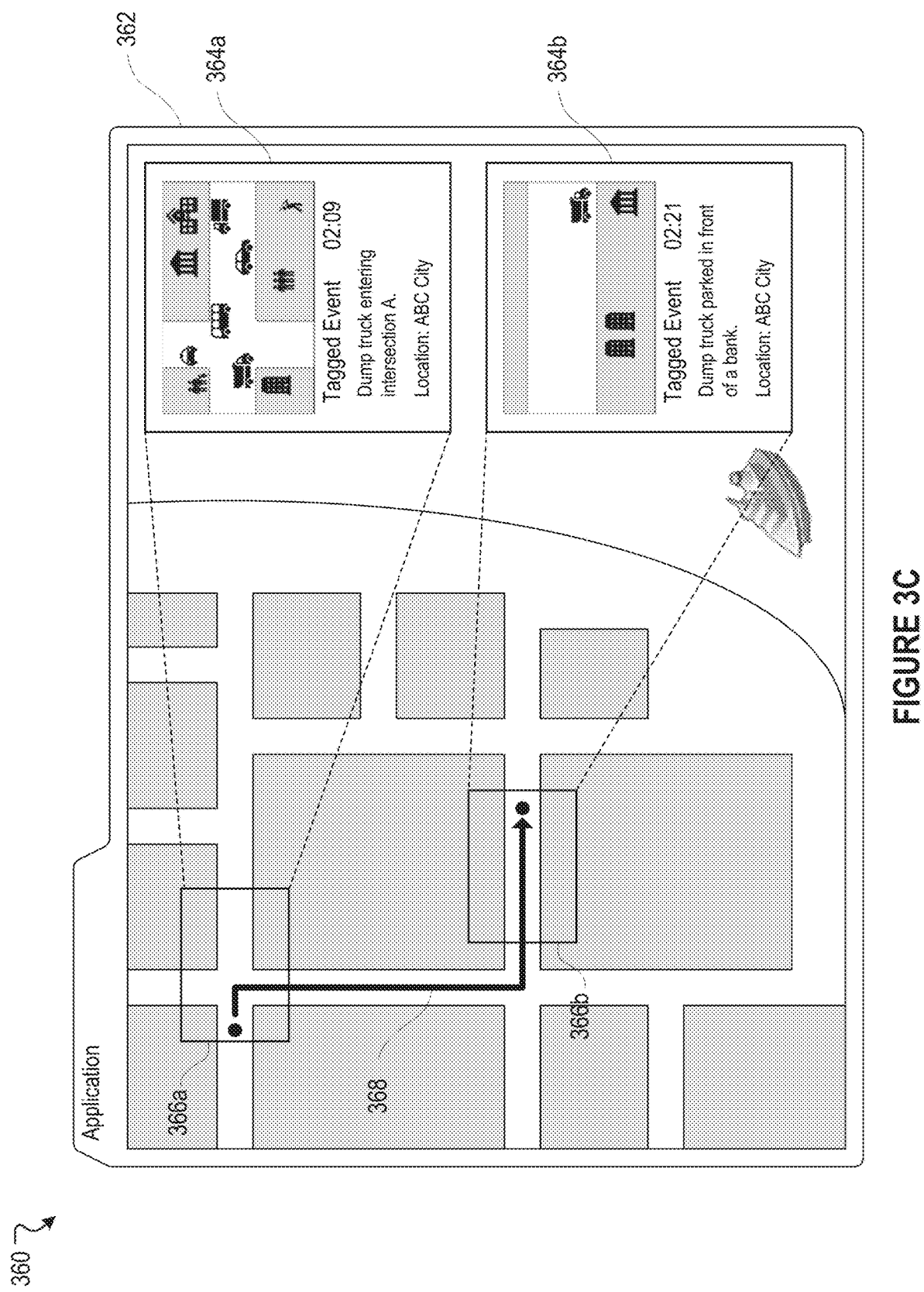
FIG. 3C illustrates an example user interface through which snippets are displayed within spatial coordinates of a map, in accordance with various embodiments.

FIG. 3C illustrates an example user interface 360 through which snippets are displayed within spatial coordinates of a map, in accordance with various embodiments. In various embodiments, the user interface 360 may be provided through a software application 362 (e.g., data analytics application, web browser, etc.) running on a computing device. In this example, a user operating the computing device accesses snippets 364a and 364b that were previously stored. In this example, the snippets 364a and 364b can be overlaid on top of a map displayed within the software application. The map can indicate regions 366a and 366b on the map that corresponds to where the snippets 364a and 364b were captured. In this example, the regions 366a and 366b are sized to match spatial coordinates of the map. In some embodiments, the software application, based on timestamp and location information of the snippets 364a and 364b, can trace out a path 368 that an entity (e.g., "dump truck") depicted in the snippets 364a and 364b traveled between the times the snippets 364a and 364b were captured. In some embodiments, the user can interact (e.g., click, press, etc.) with the regions 366a and 366b on the map. The software application 362, in response, can play the snippets 364a and 364b for the user.

Figure 3D:
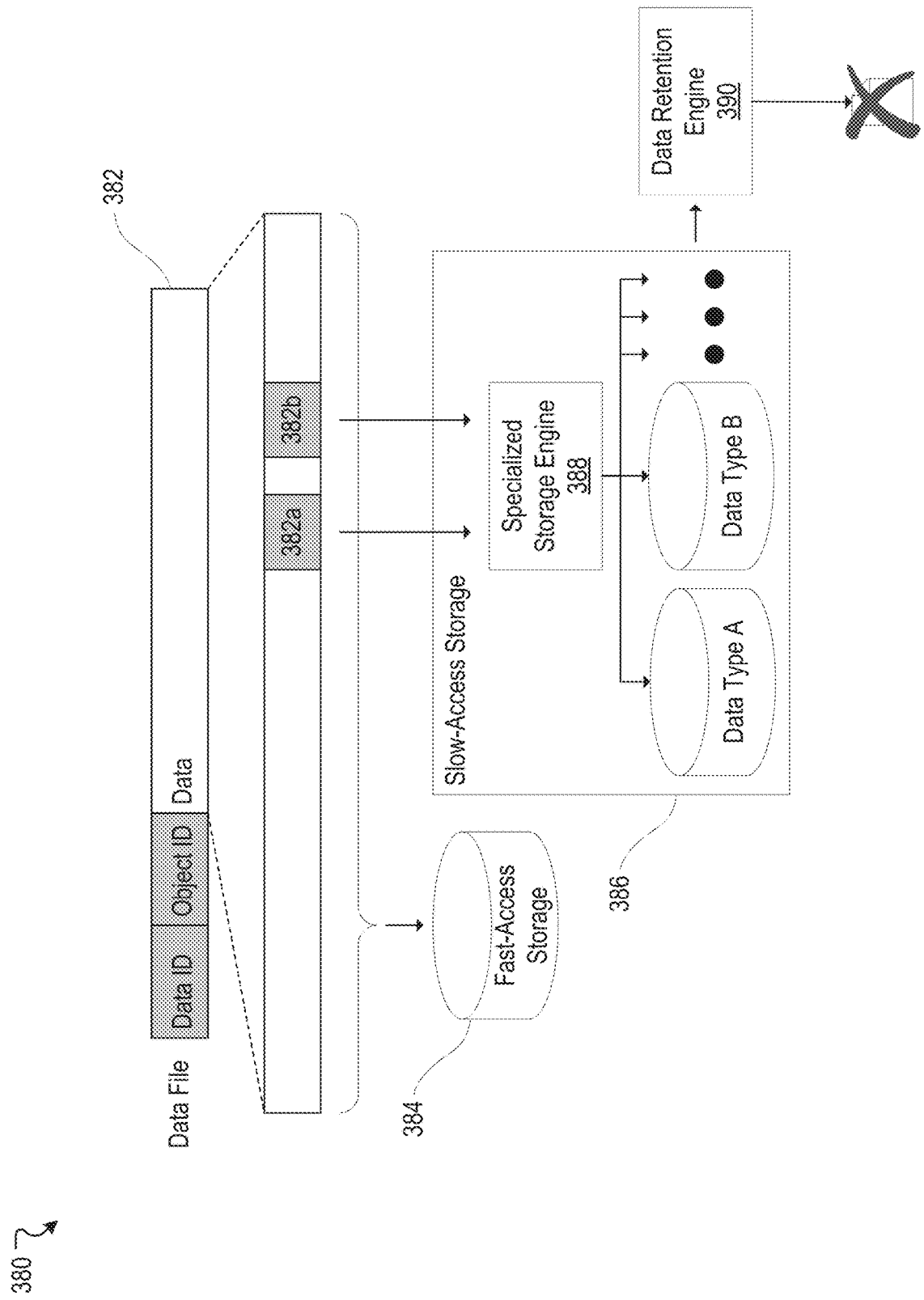
FIG. 3D illustrates a diagram showing storage of snippets, in accordance with various embodiments.

FIG. 3D illustrates a diagram 380 showing storage of snippets, in accordance with various embodiments. The diagram 380 shows a data file 382. In various embodiments, the data files 382 can be a video file, audio file, or image file. In some embodiments, the data file 382 can include data fields "Data ID," "Object ID," and "Data." The "Data ID" field indicates identification information of the data file 382. The "Object ID" field indicates identification information for the data file 382 that is associated with a data object of an enterprise data platform. The "Data" field contains binary data that corresponds to the data file 382. For example, if the data file 382 is an image file, the "Data" field includes binary data corresponding to entities depicted in the image file. It is this binary data stored in the "Data" field of the data file 382 that can be displayed on a software application (e.g., the software application 302 of FIG. 3A) running on a computing device accessing data from the enterprise data platform. When the data file 382 is accessed through the software application, the data file 382 is stored in a fast-access storage 384 (e.g., a solid state memory, flash memory, etc.). Storing the data file 382 in the fast-access storage 384 allows a user accessing the data file 382 to have quick access to the binary data, for example, to interact (e.g., play, pause, fast-forward, rewind, zoom, pan, etc.) with the data file 382, to tag entities or events, or an event containing specified entities, depicted in the data file 382, and to save snippets (e.g., 382a and 382b) of data file 382 corresponding to the tagged entities. The snippets 382a and 308b, can subsequently be stored in a slow-access storage 386 for later access.

In some embodiments, The slow-access storage 386 can include a specialized storage engine 388 (e.g., the specialized storage engine 272 of FIG. 2C). The specialized storage engine 388 can determine a data type associated with snippets and correspondingly, store the snippets into a data store for the data type. For example, the data file 382 is a video file and the snippets 382a and 382b correspondingly are snippets of video data type. In this example, the specialized storage engine 388 can determine that the snippets 382a and 382b are associated with video data type, and store the snippets 382a and 382b in a data store for storing video snippets (e.g., "Data Type A" data store). As another example, if the specialized storage engine 388 determines the snippets 382a and 382b are of audio data type, the specialized storage engine 388 stores the snippets 382a and 382b in a data store for storing audio snippets (e.g., "Data Type B" data store). In some embodiments, the diagram 380 can further include a data retention engine 390 (e.g., the data retention engine 270 of FIG. 2C). The data retention engine 390 can implement a data retention policy to free up storage space in the slow-access storage engine 386. The data retention engine 390 can delete snippets upon some period of inactivity. For example, if snippets are not accessed for a certain time period (e.g., fifteen days, thirty days, sixty days, etc.), the data retention engine 390 will automatically delete the snippets from the slow-access storage engine 388. In some cases, the data retention engine 390 can automatically delete unaccessed snippets upon expiration of a default time period.

Figure 4A:
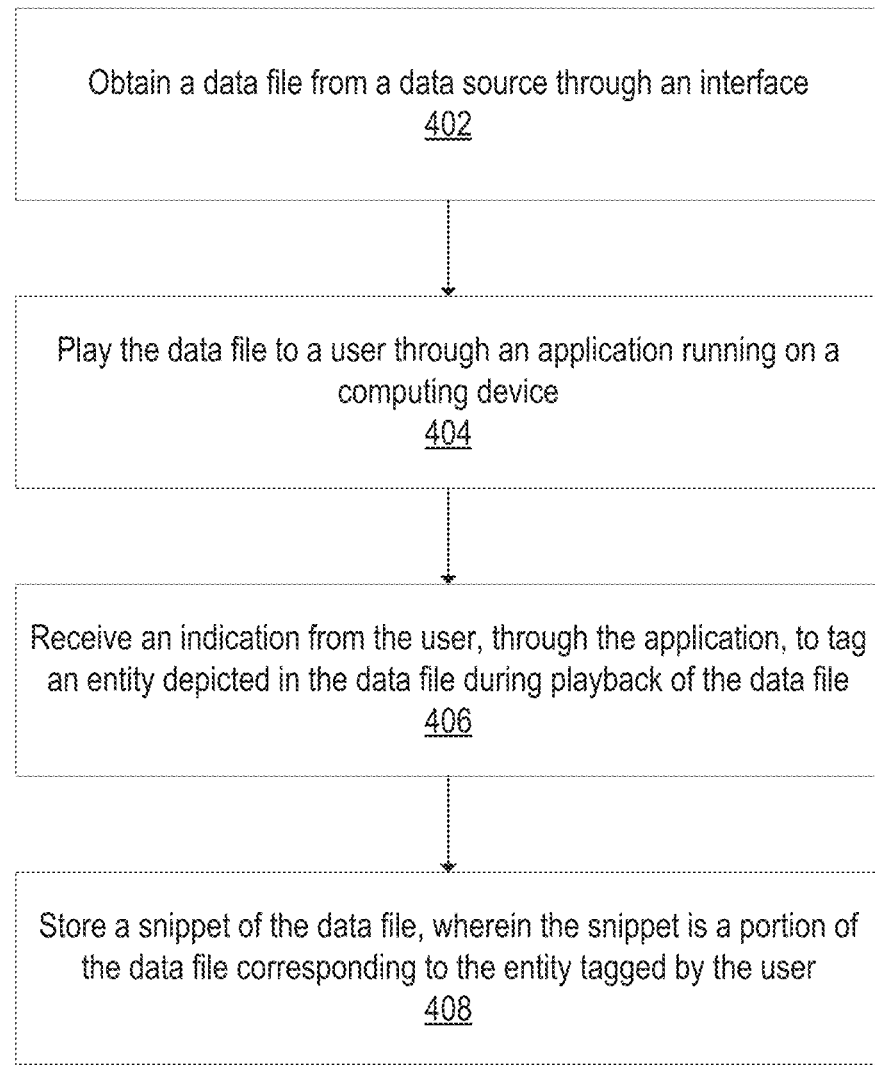
FIG. 4A illustrates a flowchart of an example method, in accordance with various embodiments.

FIG. 4A illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a data file is obtained from a data source through a plug-in interface. At block 404, the data file is played to a user through an application running on a computing device. At block 406, an indication is received from the user, through the application, to tag an entity depicted in the data file during playback of the data file. At block 408, a snippet of the data file is stored, wherein the snippet is a portion of the data file corresponding to the entity tagged by the user.

Figure 4B:
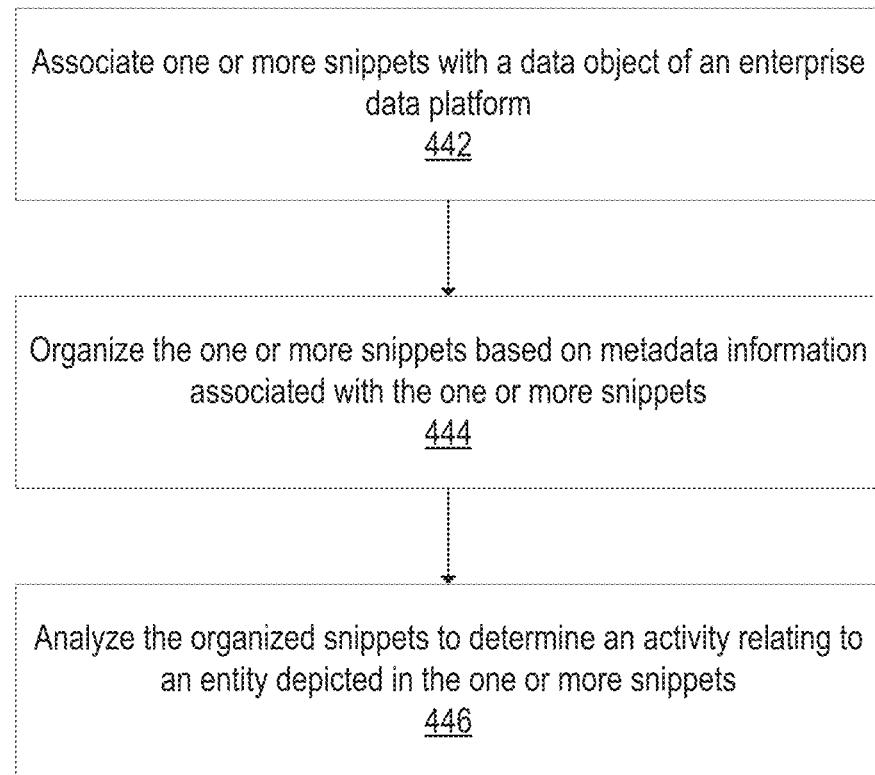
FIG. 4B illustrates a flowchart of an example method, in accordance with various embodiments.

FIG. 4B illustrates a flowchart of an example method 440, according to various embodiments of the present disclosure. The method 440 may be implemented in various environments including, for example, the environment 100 of FIG. 1. The operations of method 440 presented below are intended to be illustrative. Depending on the implementation, the example method 440 may include additional, fewer, or alternative steps performed in various orders or in parallel. The example method 440 may be implemented in various computing systems or devices including one or more processors.

At block 442, one or more snippets is associated with a data object of an enterprise data platform. At block 444, the one or more snippets is organized based on metadata information associated with the one or more snippets. At block 446, the organized snippets is analyzed to determine an activity relating to an entity depicted in the one or more snippets.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
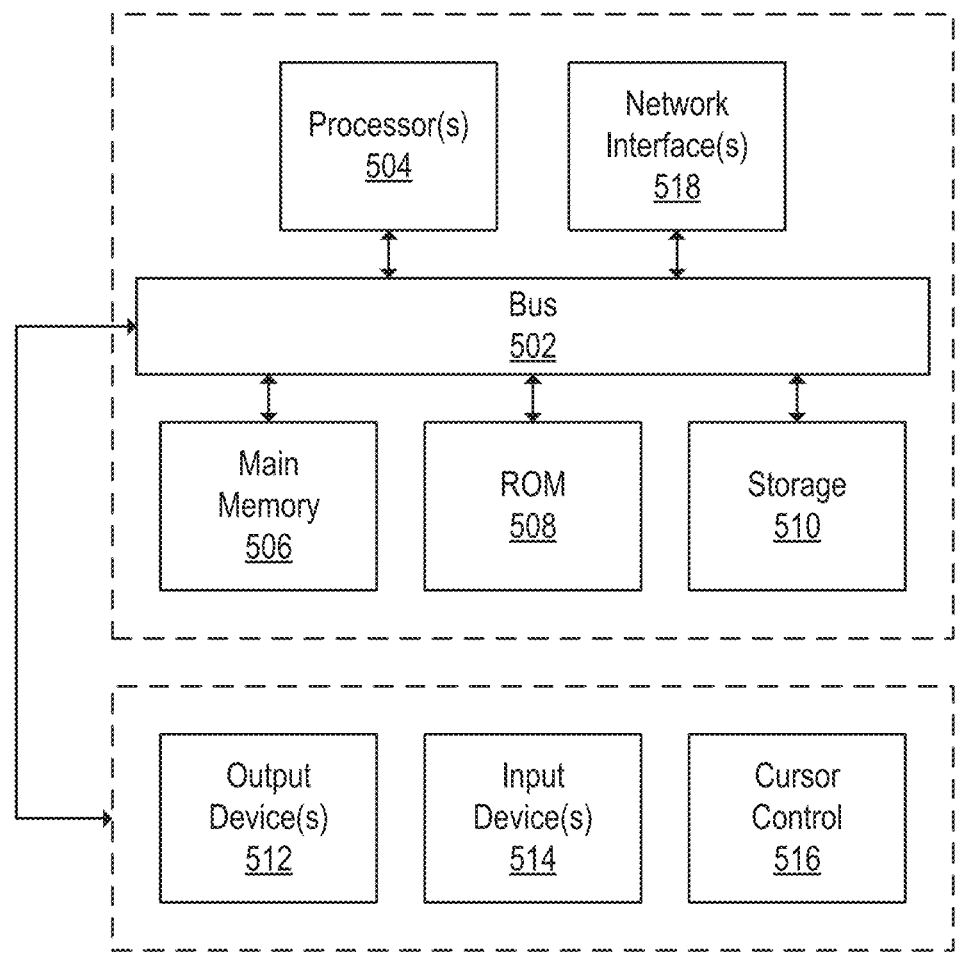
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the one or more processors to perform:
associating one or more snippets associated with an entity with a data object of an enterprise data platform to determine an activity of the entity;
organizing the one or more snippets based on metadata of the one or more snippets, the metadata including at least timestamp data and location data of the one or more snippets, wherein organizing the one or more snippets comprise:
clustering the one or more snippets based on the location data of the one or more snippets;
augmenting the one or more snippets with transactional data associated with the entity based on the timestamp data of the one or more snippets and timestamp data of the transactional data, the transactional data including at least one of commerce transactions, ingress and egress transactions, network login transactions, or geolocations of internet protocol (IP) addresses associated with the entity; and
analyzing the one or more snippets and the transactional data to determine the activity.

2. The system of claim 1, wherein the one or more snippets are user generated during playback of one or more data files accessible through the enterprise data platform.

3. The system of claim 2, wherein the metadata associated with the one or more snippets further includes annotation data by the user during the playback of the data files.

4. The system of claim 1, wherein organizing the one or more snippets based on the metadata comprises:
aligning the one or more snippets based on the timestamp data of the one or more snippets;
constructing a timeline based on the aligned snippets; and
providing the timeline through a user interface associated with the enterprise data platform.

5. The system of claim 1, wherein the instructions, when executed, cause the system to further perform:
determining locations most visited by the entity based on the clustering.

6. The system of claim 1, wherein the instructions, when executed, cause the system to further perform:
displaying the one or more snippets on spatial coordinates of a map through a user interface associated with the enterprise data platform;
determining a path the entity traversed in a given time period based on the metadata data of the one or more snippets; and
providing the path on the map through the user interface.

7. The system of claim 6, wherein determining the path the entity traversed comprises:
identifying locations the entity had visited in the given time period based on the location data of the one or more snippets;
constructing a timeline of the locations the entity had visited in the give time period based on the timestamp data of the one or more snippets and the timestamp data of the transactional data; and
determining the path the entity traversed based on the locations the entity had visited and the timeline of the locations.

8. The system of claim 1, wherein the entity is at least one of a person, a vehicle, an item, a location, or a thing of interest depicted in the one or more snippets.

9. The system of claim 1, wherein the one or more snippets are portions of data files corresponding to the entity, wherein the data files include at least one of video feeds, audio clips, or images.

10. The system of claim 1, wherein the ingress and egress transactions are associated with a badge reader of a location.

11. A computer-implemented method, the method comprising:
associating, by a computing system, one or more snippets associated with an entity with a data object of an enterprise data platform to determine an activity of the entity;
organizing, by the computing system, the one or more snippets based on metadata of the one or more snippets, the metadata including at least timestamp data and location data of the one or more snippets, wherein organizing the one or more snippets comprises:
clustering the one or more snippets based on the location data of the one or more snippets;
augmenting, by the computing system, the one or more snippets with transactional data associated with the entity based on the timestamp data of the one or more snippets and timestamp data of the transactional data, the transactional data including at least one of commerce transactions, ingress and egress transactions, network login transactions, or geolocations of internet protocol (IP) addresses associated with the entity; and
analyzing, by the computing system, the one or more snippets and the transactional data to determine the activity.

12. The computer-implemented method of claim 11, wherein the one or more snippets are user generated during playback of one or more data files accessible through the enterprise data platform.

13. The computer-implemented method of claim 11, wherein organizing the one or more snippets based on the metadata comprises:
aligning the one or more snippets based on the timestamp data of the one or more snippets;
constructing a timeline based on the aligned snippets; and
providing the timeline through a user interface associated with the enterprise data platform.

14. The computer-implemented method of claim 11, further comprising:
determining, by the computing system, locations most visited by the entity based on the clustering.

15. The computer-implemented method of claim 11, further comprising:
displaying, by the computing system, the one or more snippets on spatial coordinates of a map through a user interface associated with the enterprise data platform;
determining, by the computing system, a path the entity traversed in a given time period based on the metadata data of the one or more snippets; and providing, by the computing system, the path on the map through the user interface.

16. A non-transitory computer readable medium of a computing system storing instructions that, when executed, cause the computing system to perform:
  associating one or more snippets associated with an entity with a data object of an enterprise data platform to determine an activity of the entity;
  organizing the one or more snippets based on metadata associated with the one or more snippets, the metadata including at least timestamp data of the one or more snippets, wherein organizing the one or more snippets comprises:
    clustering the one or more snippets based on the location data of the one or more snippets;
  augmenting the one or more snippets with transactional data associated with the entity based on the timestamp data of the one or more snippets and timestamp data of the transactional data, the transactional data including at least one of commerce transactions, ingress and egress transactions, network login transactions, or geo-locations of internet protocol (IP) addresses associated with the entity; and
  analyzing the one or more snippets and the transactional data to determine the activity.

17. The non-transitory computer readable medium of claim 16, wherein the one or more snippets are user generated during playback of one or more data files accessible through the enterprise data platform.

18. The non-transitory computer readable medium of claim 16, wherein organizing the one or more snippets based on the metadata comprises:
  aligning the one or more snippets based on the timestamp data of the one or more snippets;
  constructing a timeline based on the aligned snippets; and
  providing the timeline through a user interface associated with the enterprise data platform.

19. The non-transitory computer readable medium of claim 16, wherein the instructions, when executed, cause the computing system to further perform:
  determining locations most visited by the entity based on the clustering.

20. The non-transitory computer readable medium of claim 16, wherein the instructions, when executed, cause the computing system to further perform:
  displaying the one or more snippets on spatial coordinates of a map through a user interface associated with the enterprise data platform;
  determining a path the entity traversed in a given time period based on the metadata data of the one or more snippets; and
  providing the path on the map through the user interface.

* * * * *